S. ARCHBOLD & J. HAUG.
COMPOUND ENGINE.

No. 190,534. Patented May 8, 1877.

Witnesses
Richard L. Gardiner
Harry Smith

Samuel Archbold
and John Haug
by their Attorneys
Howson and Son

UNITED STATES PATENT OFFICE.

SAMUEL ARCHBOLD AND JOHN HAUG, OF PHILADELPHIA, PENNSYLVANIA.

IMPROVEMENT IN COMPOUND ENGINES.

Specification forming part of Letters Patent No. 190,534, dated May 8, 1877; application filed August 4, 1876.

*To all whom it may concern:*

Be it known that we, SAMUEL ARCHBOLD and JOHN HAUG, of Philadelphia, Pennsylvania, have invented certain Improvements in Compound Steam-Engines, of which the following is a specification:

The object of our invention is to so construct a compound engine for paddle-wheel steamboats, or for stationary purposes, that it may possess all the advantages of coupled engines with long strokes, as well as the further advantages of having a light but strong frame-work, general simplicity, economy, and compactness.

Figure 1:
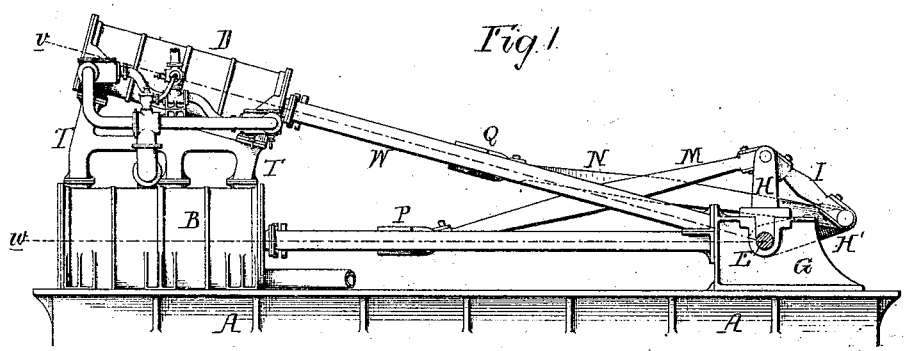
Figure 2:
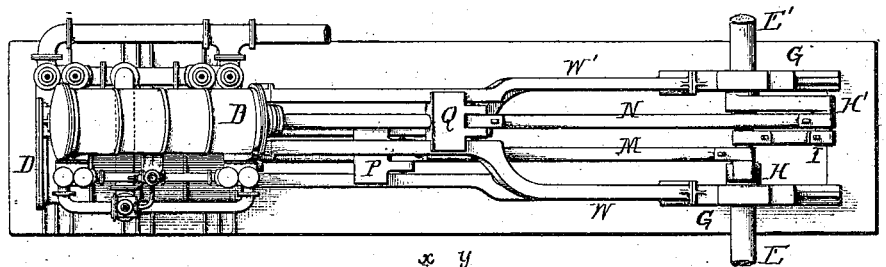
Figure 3:
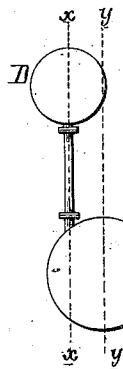

In the accompanying drawing, Figure 1 is a side view, and Fig. 2 a plan view, of our improved compound steam-engine; Fig. 3, an end view, illustrating the relative positions of the high and low pressure cylinders.

A represents the base-plate of the engine; B, the large low-pressure cylinder; D, the small high-pressure cylinder; E E', the two crank-shafts, and G G bearings for the same. The shaft E has a crank, H, and the shaft E' a similar crank, H'; and the pins of the two cranks are so connected together, by a drag-link, I, that the cranks shall be arranged at or about the angle shown in the drawing.

In order to permit this arrangement of cranks and drag-link, the two cylinders are placed laterally out of line, as best observed on reference to Fig. 3, the distance between the vertical dotted line $x$ (passing through the center of the cylinder D) from the dotted line $y$ (passing through the center of the large cylinder B) being sufficient for this arrangement.

The pin of the crank H is connected, by a rod, M, to the cross-head P of the large cylinder, and the pin of the crank H' is connected, by a rod, N, to the cross-head Q of the small cylinder.

The two cylinders are arranged at the angle, in respect to each other, indicated by the dotted lines $v$ and $w$, the line $v$ passing longitudinally through the center of the small cylinder and center of the crank-shaft, and the line $w$ through the center of the small cylinder and the center of the crank-shaft. This relative position of the two cylinders may be varied to some extent; but we prefer to arrange them at or about the angle shown in the drawing.

The two cylinders are connected together by a simple frame, T, as shown in Figs. 1 and 3, this frame being such as to permit the compact arrangement of the necessary valves and connections partly on one side and partly on the other side of the connecting-frame T, which, if desired, may be made hollow, so as to form steam-passages.

In the drawing we have shown an arrangement of valves and connections; but these constitute no part of our present invention, as different arrangements of valves may be employed.

The frame-work of the engine is of simple and economical construction, two bars, W and W', extending from the small cylinder to the bearings G G of the crank-shaft, and serving as guides for the cross-head Q, and two similar bars extending from the main cylinder to said bearings, and serving as guides for the cross-head P.

The invention is especially applicable to the construction of direct-acting long-stroke compound engines for paddle-wheel steamboats, as the engine occupies but very little space. The character of the engine, moreover, insures a more equal distribution of strains over the hull of the vessel than a walking-beam engine.

When used for steamboats, the large cylinder should be depressed, so that the small cylinder is parallel, or thereabout, with the deck. When used as a stationary engine—as, for instance, when each of the crank-shafts A and A' has to drive a train of rolls—the cylinder and other parts of the engine may be arranged precisely as shown in the drawing.

It will be seen from the foregoing description that all the advantages of a long-stroke engine, a compound steam-engine, and coupled engines are attained by our invention, while the entire structure is compact, simple, and economical.

We claim as our invention—

The combination of the two cylinders B and D, arranged, in respect to each other, as set forth, with a connecting-frame, T, the bearings G G of the crank-shafts, and the crosshead guide-bars, extending from the said cylinder to the said bearings, all substantially as set forth.

In testimony whereof we have signed our names to this specification in the presence of two subscribing witnesses.

SAML. ARCHBOLD.
     JOHN HAUG.

Witnesses:
 HARRY HOWSON, Jr.,
 HARRY SMITH.